FILTER FOR ENCODING COLOR DIFFERENCE SIGNALS

Filed Dec. 30, 1965

INVENTOR
ALBERT MACOVSKI
BY Samuel Lindenberg
ATTORNEY

INVENTOR
ALBERT MACOVSKI
BY Samuel Lindenberg
ATTORNEY

United States Patent Office 3,419,672

Patented Dec. 31, 1968

3,419,672

FILTER FOR ENCODING COLOR DIFFERENCE SIGNALS

Albert Macovski, Palo Alto, Calif., assignor to Stanford Research Institute, Menlo Park, Calif., a corporation of California Filed Dec. 30, 1965, Ser. No. 517,638
8 Claims. (Cl. 178—5.4)

ABSTRACT OF THE DISCLOSURE

The present invention is directed to a spatial filter for encoding a color image on a monochrome film or a television camera, the filter consisting of alternate lines of colored and neutral material where the energy transmission as seen by the film emulsion or the television camera is equal in the colored and neutral areas. The white areas of the scene will contain no line structure.

This invention relates to an arrangement for photographing scenes on a monochrome sensitized surface which can thereafter be scanned in a manner to produce electrical signals containing color information for a color television receiver, or for enabling a monochrome television camera to produce signals for a color television receiver.

In an application by this inventor entitled "Photography Using Spatial Filtering," which was filed June 24, 1965 and bears Ser. No. 466,547, now abandoned there was disclosed an arrangement for photographing a scene on monochrome film through a spatial filter whereby the color information in the scene was recorded on the monochrome film. This film could thereafter be illuminated and by employing a spatial mask, the scene may be displayed upon the screen in its natural color.

In another application by this inventor entitled "A Monochrome Photography System for Color Television," which bears Ser. No. 46,624, filed June 24, 1965, Patent No. 3,378,633 there was described an arrangement for scanning a monochrome negative upon which the scene had been recorded through the spatial filter, in a manner so that electrical signals may be derived which, when applied to a color television receiver, would reproduce in color the scene which was so photographed. There is also described an arrangement for using a monochrome television camera for generating color television signals by applying a spatial filter of a specific construction to its photosensitive area.

In yet another application by this inventor, Ser. No. 501,673, filed Oct. 22, 1965, Patent No. 3,378,634, entitled "System for Scanning Color Encoded Film with a Monochrome Television Camera," there are described several arrangements for enabling a monochrome television camera to provide color information from a negative which has been used to photograph a scene through a spatial filter.

All of the foregoing inventions employ spatial filters which encode the color information on a panchromatic sensitive monochrome emulsion, or encode the image presented to a television camera tube so that color television signals may be derived from its output. If it were possible to encode the color information as color difference signals rather than as color signals, it would be preferable because color difference signals exist only in colored areas, such that all grey areas are devoid of line structure caused by the lines in the spatial filters which are employed. Further, any failure to adequately resolve the line structure of the spatial filter due to defocusing or other causes, would represent only a saturation change in the final image, rather than introducing erroneous colors into a normally neutral area.

Accordingly, an object of this invention is the provision of a spatial filter for encoding color difference signals.

Yet another object of this invention is the provision of apparatus including a spatial filter which will enable a monocrome sensitive television camera to produce signals suitable for a color television receiver from a scene encoded by means of this spatial filter.

Still another object of this invention is the provision of an improved arrangement for enabling a single monochrome television camera to produce signals from which color television signals for a color television receiver may be derived.

These and other objects of the invention may be achieved, where it is desired to encode a scene on a panchromatic monochrome negative by photographing the scene through a filter which consists of alternate lines of colored and neutral material where the energy transmission as seen by the film emulsion or by the photosensitive area of a television camera is equal in the colored and neutral areas. Accordingly, white areas of the scene will contain no line structure. The amplitude of the line structure represents the absolute value of the color difference signal. For example, a spatial filter, in accordance with this invention, consists of a grating of alternate cyan and grey lines arranged so that white light will cause no line structure. Disposed at an angle thereto and superimposed thereover is a second grating consisting of alternate lines of a second substractive primary color, such as yellow, with the remaining lines being grey. If the spatial filter is used for encoding a scene on film, then the filter is placed adjacent to the film and the scene is photographed onto the film through the filter. Upon development, the film can be scanned by a flying spot scanner at a television rate and the output modulated light signals are detected by a photocell. The output of the photocell will include a luminance signal together with two color difference signals. Similarly, the spatial filter may be placed upon the photocathode of a television camera which is used to photograph a scene. The output of the camera will contain the luminance signal together with two color difference signals.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 6:
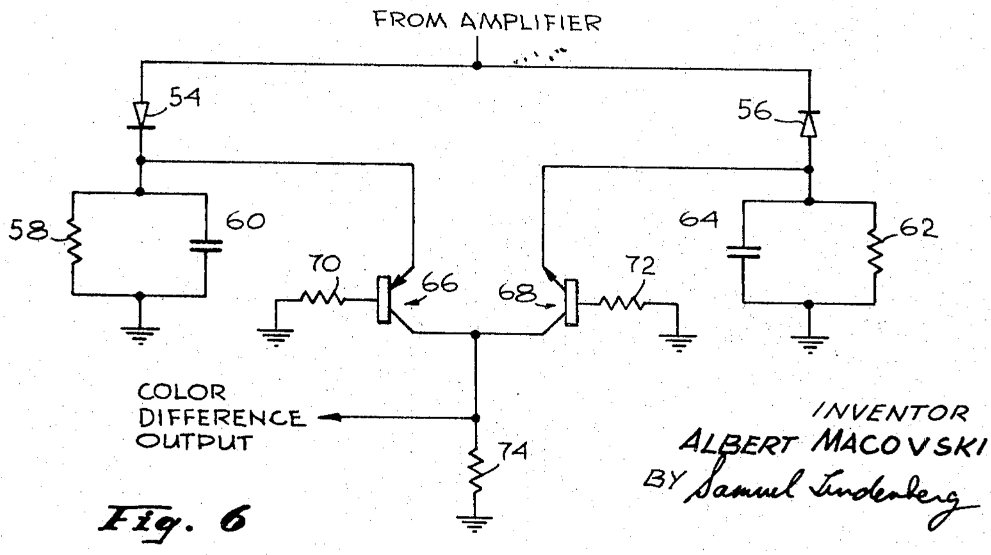
Figure 5:
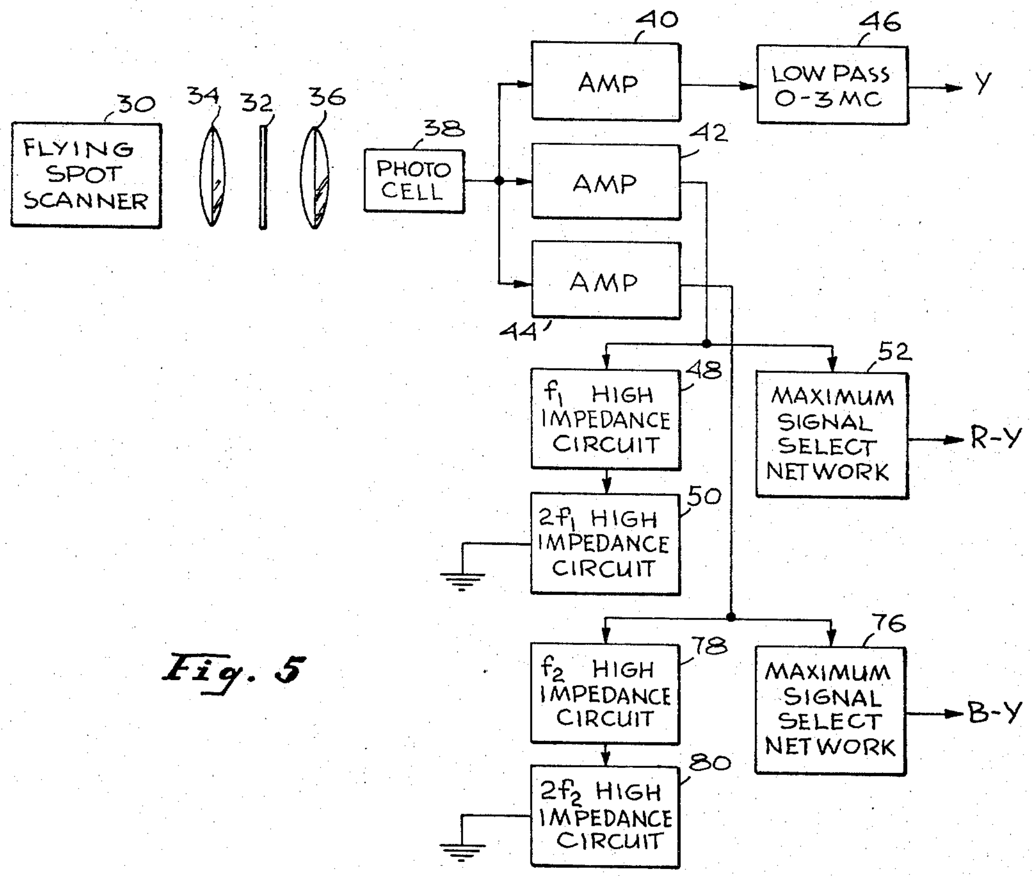
Figure 7:
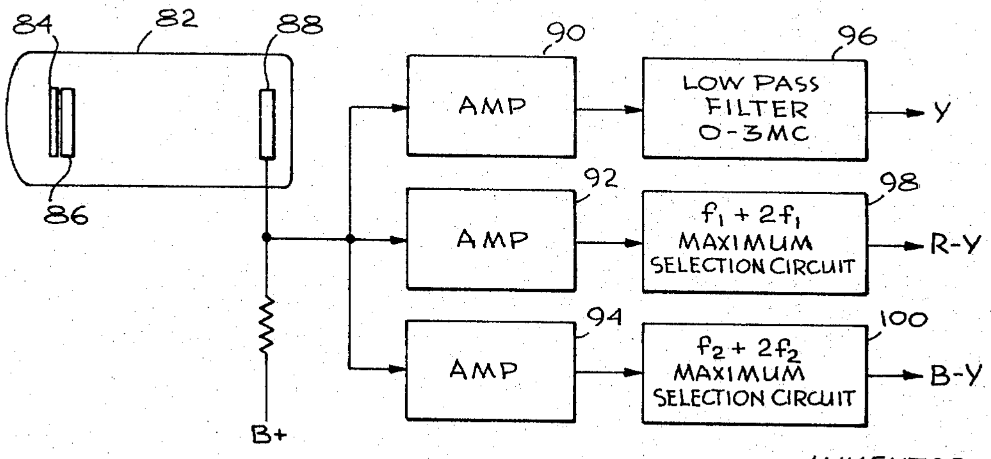

FIGURE 5 illustartes an arrangement for deriving color difference signals suitable for use by a television receiver, from a film that has been encoded;

FIGURE 6 is a maximum signal selecting circuit which is used with this invention; and FIGURE 7 shows an arrangement for combining the spatial filter, in accordance with this invention, with a television camera, and for deriving signals required for operating a color television receiver from the output of the television camera.

As previously indicated, a grating or filter for encoding color difference signals consists of alternate lines of colored and neutral material, where the energy transmission, as seen by the film emulsion (panchromatic film) or the photosensitive area (also panchromatic) of the television camera is equal for the colored and neutral areas. Thus in using a grating for encoding a single color difference signal, consisting of alternate cyan and grey lines, white light will cause no line structure. The amplitude of the line structure will represent $|R-Y|$, the absolute value of the difference between red and luminance. However, the absolute value of $|R-Y|$ has an ambiguity which must and can be resolved in a number of ways. The reason for the ambiguity is that in a scene containing both cyan light and red light, the output of the filter will contain line structure, and some means must be found for distinguishing between the line structure due to red light and that due to cyan light.

One arrangement which may be used is to keep track of the phase of the grating signal as the grating is being scanned by comparing the signal to a reference. This method is difficult, however, in that it puts highly restrictive requirements on deflection linearity.

Another method for finding the polarity of the $R-Y$ signal, or another comparable color difference signal, is to use an additional grating at a different angle with alternate lines of red and grey, again arranged so that white regions cause no line structure. The different frequencies produced on scanning can be envelope detected, one positively and the other negatively. The one of the two resulting signals with the larger magnitude is then used for the output signal forming $R-Y$ which is positive for red colors and negative for cyan (green and blue) colors.

The simplest and preferred method for resolving the polarity ambiguity between red and cyan signals is to use a nonsymmetric structure in the original encoding grating. As exemplified in FIGURE 1, the grey lines 10 are the same in number as the cyan lines 12, but are different in width. This line structure, when scanned, will produce an asymmetric waveform. The ambiguity between the effects of red light and cyan light which falls upon a filter such as the one shown in FIGURE 1 can be resolved by detecting the positive and negative peak of the AC component of waveform and noting which is higher. For cyan color falling upon the filter, the positive peak will be higher than for red color. The reason is that the cyan filter lines will hold back or block the red light from passing therethrough.

Figure 1:
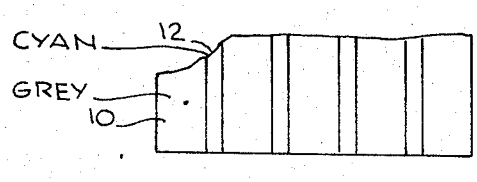
FIGURE 1 illustrates a grating arrangement for a filter in accordance with this invention whereby the phase ambiguity between the color signal and the color difference signal may be resolved.
Figure 2:
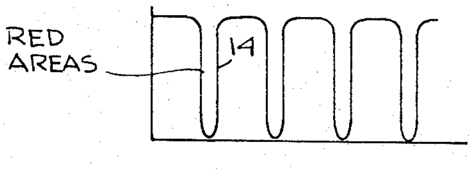
FIGURE 2 and FIGURE 3 are waveforms which are shown to assist in an understanding of the explanation of FIGURE 1.
Figure 3:
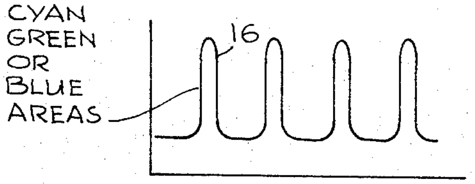

The arrangement of FIGURE 1 is such that when white light falls upon the filter, it will be transmitted equally through both areas. However, when an illuminated image is looked at through the filter with, for example, a photocell, the waveform 14 in FIGURE 2 represents the electrical signals which are derived from the red areas. The waveform 16 in FIGURE 3 represents the electrical signals which are derived when a scene is viewed through the filter, which has cyan, green or blue areas.

Thus, in the cyan, green or blue areas, the positive peak of the AC component exceeds the negative component, with the opposite being true in the red areas. The asymmetry conditions can be evaluated in a more efficient manner by extracting first and second harmonics with tuned circuits, adding these to produce an asymmetric signal wherein the nature of the asymmetry is determined by the color. By envelope detecting the positive and negative peaks of the signal and selecting the larger one of the two, a color difference representative signal is derived. For example, if the positive and negative peaks of the AC compoment of the waveform of FIGURE 2 are envelope detected, the negative peak will predominate producing a negative output. The waveform of FIGURE 3 will produce a positive output.

Figure 4:
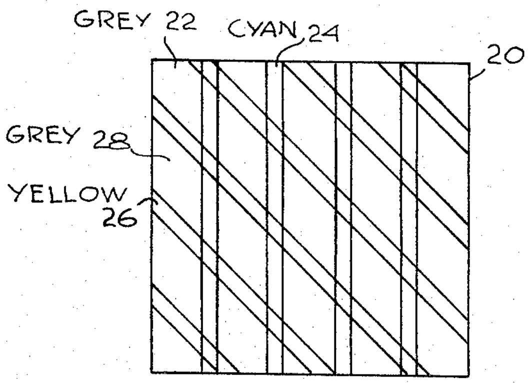
FIGURE 4 is a representation of a filter, in accordance with this invention, which is used to encode color difference signals.

FIGURE 4 shows a spatial filter 20 which, in accordance with this invention, may be used for encoding color difference signals from a scene either photographed upon a panchromatic sensitive monochrome film or photographed by a television camera. The filter has alternate grey and cyan lines lines respectively 22, 24, such as are shown in FIGURE 1, which do not produce a line structure in white light. Approximately 270 vertical lines are used in the cyan filter. A second grid, superimposed upon the first grid, consists of alternate asymmetric yellow and grey lines respectively 26, 28. There are also provided 270 yellow lines. With this filter, the $R-Y$ information is encoded by the vertical cyan lines. The $B-Y$ information is encoded by the diagonally disposed yellow lines. The average transmission of the filter represents the luminance or Y signal.

The filter is placed adjacent to the sensitized surface of a panchromatic-monochromatic film and a photograph may be taken with the film either stationary as in a still camera or moving as in a motion picture camera. FIGURE 5 shows an arrangement for deriving the color difference information which is encoded on the film. A flying spot scanner 30 illuminates an encoded negative 32 through a lens 34. The flying spot scanner actually sequentially scans the encoded negative at a television scanning frequency. The light which passes through the transparency 32 is focused by another lens 36 upon a photocell 38. The cyan grating recorded on the emulsion, when scanned, results in a repetition rate of $f_1$, while the yellow grating will produce a repetition rate of $f_2$. The $f_1$ signal produced by the conventional television scan (53 microseconds per television line ) is a 5 megacycle signal which is amplitude modulated by the amount of cyan and red light present. The $f_2$ signal which is produced is a 3½ megacycle signal which is amplitude modulated by the amount of yellow and blue light which is present. The low frequency information which is derived as a result of the scanning represents the average light and is the amplitude of the luminance component.

The output of the photocell 38 is then applied to a following network which produces the luminance and color difference signals. The photocell output, for isolation purposes, is applied to three amplifiers 40, 42, 44. The output of the amplifier 40 is applied to a low pass filter 46 (0 to 3 megacycles), the output of which is the luminance signal Y.

The output of the amplifier 42 is applied to a network comprising two serially connected transmission filters respectively 48, 50, which are connected in parallel with a maximum signal select network 52. Filter 48 rejects all frequencies but those in the vicinity of $f_1$. Filter 50 rejects all frequencies but those in the vicinity of $2f_1$. Each of these may be, for example, a parallel resonant circuit which provides a high impedance for $f_1$ and $2f_1$ and a low impedance for all other frequencies. As a result, the fundamental and second harmonic frequencies are added and applied to the maximum signal select network 52 which selects the maximum signal which is either the positive or the negative peak. This is the $R-Y$ signal. The maximum signal selection network 52 may comprise an arrangement such as is shown in FIGURE 6. The output of the amplifier 42 is applied to two oppositely poled diodes respectively 54, 56. The cathode of diode 54 is connected to an integrating network consisting of a resistor 58 in parallel with a capacitor 60. The diode 56 anode is connected to an integrating network comprising a resistor 62 connected in parallel with a capacitor 64. The emitter of a PNP transistor 66 is connected to the cathode of diode 54, the emitter of NPN transistor 68 is connected to the anode of diode 56. The base of transistor 66 is connected through a resistor 72 to ground. The base of transistor 68 is connected to a resistor 72 to ground. The collectors of the two transistors are connected through a resistor 74, whose value is large relative to the values of the base resistors, to ground.

Because of the relatively large value collector resistor 74, one of the two transistors 66, 68 is always in saturation even for a slight difference in the magnitude of the signals applied to their emitters. The one which is in saturation is the one which is connected to the larger of the two voltages as established across the capacitors 60, 64 by the diodes 54, 56 which separate the positive and negative peaks from one another. Accordingly, the output voltage which is seen across the collector resistor 74 comprises the $R-Y$ color difference signal.

Amplifier 44 is connected to a similar network to the one described previously. It is connected to a maximum signal selecting network 76 and also to serially connected fundamental transmission filter 78 ($f_2$) and second harmonic transmission filter 80 ($2f_2$), which respectively present a high impedance to $f_2$ and $2f_2$. The output of the maximum signal selecting network 76 is the color difference signal $B-Y$.

FIGURE 7 shows an arrangement for combining the spatial filter with a conventional television camera such as a vidicon camera whereby the output will contain the luminance and color difference signals required for a color television receiver. The vidicon camera 82 is schematically represented. The only modification required thereof is the placement of a spatial filter 84, such as is shown in FIGURE 4 herein, adjacent the photocathode 86. In the event such placement provides problems, the spatial filter may be placed on the outside of the camera tube with fiber optic bundles in between the photocathode and the outside of the glass envelope. In this manner, the light signals received by the photocathode from the scene being televised are encoded in the same manner as they are encoded on a monochrome negative.

The target 88 produces electrical signals at the output which are derived by scanning the photocathode. The target is connected to three amplifiers respectively 90, 92, 94. The output of the amplifier 90 is connected to a low pass filter 96 whose output constitutes the luminance signal. The output of the amplifier 92 is applied to circuitry similar to that represented by the rectangles 48, 50, and 52 in FIGURE 5, here called the $f_1+2f_1$ maximum selection circuit 98. The output of this circuit is the $R-Y$ color difference signal. The output of amplifier 94 is connected to circuitry representative of the rectangles 78, 80, and 76 in FIGURE 5. This circuitry is called the $f_2+2f_2$ maximum selection circuit 100. Its output is the $B-Y$ color difference signal.

The outputs Y, $R-Y$ and $B-Y$ may be used directly by a color television receiver or may be used by a color transmitter.

There has accordingly been shown and described herein a novel, useful system wherein a spatial filter is employed for encoding light signals as color difference signals. These light signals can then be converted to color difference representative electrical signals suitable for operating a color television receiver.

I claim:

1. A spatial filter for encoding the light passing therethrough as a color difference comprising a first grid of parallel spaced lines alternate lines of which have a different width than the remaining lines, said alternate lines having one subtractive primary color, the remaining lines being grey in color, a second grid relatively angularly superimposed over said first grid said second grid having parallel spaced lines alternate ones of which have a different width than the remaining ones of said lines, said alternate lines being a second subtractive primary color, the remaining lines of said second grid being grey in color.

2. Apparatus as recited in claim 1 wherein the relative angle between said first and second grids is 45° and the total number of lines in each of said first and second grids are approximately 270.

3. Apparatus as recited in claim 1 wherein said first subtractive primary color is cyan and said second subtractive primary color is yellow.

4. Apparatus for generating the color representative electrical signals required for a color television receiver to reproduce a scene in color from the output of a television camera having a photocathode exposed to said scene, a target and means for scanning said photocathode for transferring the image on said photocathode as a sequence of electrical signals to said target, said apparatus comprising a filter adjacent said photocathode to intercept the light falling thereon from said scene, said filter having a first grid of parallel spaced lines alternate ones of which are wider than the remaining ones and are colored a first subtractive primary color, the remaining ones of which are colored grey, a second grid of parallel spaced lines diagonally superimposed over said first grid, said second grid comprising a plurality of parallel lines alternate ones of which are colored a second subtractive primary color and are narrower than the remaining ones which are colored grey, first low pass filter means connected to said camera target for deriving therefrom electrical signals representative of the luminance of said scene, first means connected to said target for deriving therefrom a first color difference signal determined by the color of the alternate lines of said first grid, second means connected to said target for deriving therefrom a second color subtractive signal as determined by the color of said alternate lines of said second grid.

5. Apparatus as recited in claim 4 wherein said first means for deriving first color difference signals from said target comprise means for adding the fundamental frequency and second harmonic of the signal components in the output of said target due to said alternate ones of said lines in said first grid to produce a first sum signal, means for deriving from said first sum signal relatively positive and negative waveshape, and means for selecting the one of these waveshapes having the larger amplitude as the first color difference signal, said second means for detecting second color difference signals in said target output signal comprising means for adding the fundamental and second harmonic frequency of said target output signal produced by said alternate lines of said second grid to produce a second sum signal, means for separating said second sum signal into signals having a relatively positive and negative waveshape, and means for selecting the larger of said signals which is representative of the second color difference signal.

6. A system for generating electrical signals required for a color television receiver to reproduce in color an image photographed on a monochrome negative through a filter comprising a grid of lines alternate ones of which are colored cyan and are narrower than the remaining ones of which are colored grey, a second grid of lines superimposed upon said first grid and diagonally disposed relative thereto, alternate ones of lines of said second grid are yellow and are narrower than the remaining lines of said second grid which are colored grey, said system including flying spot scanner means for scanning said monochrome transparency, photocell means for generating electrical signals responsive to the light passing through the transparency from said flying spot scanner means, low pass filter means for deriving from the output of said photocell means a luminance representative signal, first means for deriving from the output of said photocell means an electrical signal representative of the color difference signal red minus luminance, second means for deriving from the output of said photocell means an electrical signal representative of the color difference signal blue minus luminance.

7. Apparatus as recited in claim 6 wherein said first means for extracting from the output of said photocell means a first color difference signal includes means for deriving from said photocell means a first sum signal comprising the sum of a fundamental frequency and the second harmonic frequency of a first signal determined by the cyan lines in said filter, means for dividing said sum signal into two signals having a relatively positive and negative waveshape, and means for selecting the maximum one of said two signals which is representative of the first color difference signal, and said second means for deriving from said target output second color difference signal comprises means for deriving from said target output a second sum signal comprised of the sum of a fundamental frequency and a second harmonic of a second signal determined by the yellow lines in said grid, means for generating two signals having a relatively positive and negative waveshape from said second sum signal, and means for detecting the larger one of said two signals which is representative of the second subtractive color signal.

8. A spatial filter for encoding the light passing therethrough as a color difference comprising a first grid of parallel spaced lines of one subtractive color, said spaces between said spaced lines being of a neutral color, and the energy transmission of said first grid of parallel spaced lines and the spaces therebetween being established for transmitting white light with substantially no grating modulation, and a second grid of parallel spaced lines, said second grid being angularly superimposed over said first grid, the lines of said second grid being of a second subtractive color, said spaces between said second grid lines being of a neutral color, and the energy transmission of said second grid of parallel spaced lines and the spaces therebetween being established for transmitting white light with substantially no grating modulation.

References Cited

UNITED STATES PATENTS

| | | | |
|---|---|---|---|
| 2,733,291 | 1/1956 | Kell | 178—5.4 |
| 3,300,580 | 1/1967 | Takagi et al. | 178—5.4 |

ROBERT L. GRIFFIN, *Primary Examiner.*

RICHARD MURRAY, *Assistant Examiner.*